United States Patent
Duhame

[19]

[11] Patent Number: 5,191,268
[45] Date of Patent: Mar. 2, 1993

[54] CONTINUOUSLY MONITORED SUPPLEMENTAL OBSTRUCTION DETECTOR FOR GARAGE DOOR OPERATOR

[75] Inventor: Dean C. Duhame, Roseville, Mich.
[73] Assignee: Stanley Home Automation, Novi, Mich.
[21] Appl. No.: 750,102
[22] Filed: Aug. 26, 1991
[51] Int. Cl.$^5$ .................. E05F 15/16; H02H 7/085
[52] U.S. Cl. .................. 318/266; 318/467; 318/480; 49/25; 49/26
[58] Field of Search .......... 318/264, 265, 266, 267, 318/283, 286, 466, 467, 468, 469, 480; 49/24, 25, 26, 28, 197

[56] References Cited

U.S. PATENT DOCUMENTS

| | | | |
|---|---|---|---|
| 3,555,535 | 1/1971 | Henrigues. | |
| 3,689,814 | 9/1972 | Holt | 318/266 |
| 3,783,556 | 1/1974 | Cook | 49/25 |
| 4,239,961 | 12/1980 | Lasar. | |
| 4,249,074 | 2/1981 | Zettler et al.. | |
| 4,386,398 | 5/1983 | Matsuoka et al. | 318/266 X |
| 4,621,452 | 11/1986 | Deeg. | |
| 4,706,227 | 11/1987 | DuVall et al. | 367/96 |
| 4,843,639 | 6/1989 | Beals | 318/480 X |
| 4,866,881 | 9/1989 | Morrow et al.. | |
| 4,914,859 | 4/1990 | Gionet et al.. | |
| 4,922,168 | 5/1990 | Waggamon et al.. | |
| 4,953,608 | 9/1990 | Larsson. | |

Primary Examiner—Bentsu Ro
Attorney, Agent, or Firm—Krass & Young

[57] ABSTRACT

An automatic door operator with a continuously monitored supplemental obstruction detector. In a first embodiment, the obstruction detector is a radiant beam obstruction detector that transmits a beam of modulated radiant energy across the door opening. A safety signal generator produces an active safety signal only on unobstructed receipt of radiant energy by a receiver. Failure to receive the active safety signal when the motor is closing the door at least stops the door. A two wire cable, which carries both power and the active safety signal, connects the supplemental obstruction detector to the automatic door operator. Constant activation of a portable transmitter or of a local push button can override the supplemental obstruction detector to close the door. An alternative supplemental obstruction detector includes a safety edge having a compressible tube disposed on a leading end of the door. Plural conductors change their conductive state upon compression of the compressible tube. This embodiment may include a delay upon detection of compression of the compressible tube so that contact with the floor is not detected as an obstruction.

25 Claims, 3 Drawing Sheets

CONTINUOUSLY MONITORED SUPPLEMENTAL OBSTRUCTION DETECTOR FOR GARAGE DOOR OPERATOR

TECHNICAL FIELD OF THE INVENTION

The technical field of the present invention is that of obstruction detectors for automatic door operators such as used for garage doors. In particular, this invention is in obstruction detectors which supplement the prior art primary obstruction detector.

BACKGROUND OF THE INVENTION

The present invention is in automatic door operators such as used in garage doors. Such automatic door operators typically employ a motor to move the door between an opened and a closed position in response to control signals. A wall mounted push button and a portable radio frequency transmitter are generally provided to generate these control signals.

It has been known for many years that such automatic garage door operators need some form of obstruction detection. Obstruction detection prevents personal injury or property damage caused by the controlled door closing on something. Obstruction detection also prevents damage to the door and the various driving components that would result from operation against an obstacle.

SUMMARY OF THE INVENTION

This invention is in automatic door operators. Such automatic door operators have a motor coupled for moving a door between an open position and a closed position covering an opening, and a controller controlling operation of the motor corresponding to command signals. The present invention is a continuously monitored obstruction detector.

In a first embodiment, the obstruction detector is a radiant beam obstruction detector. The radiant beam obstruction detector includes a transmitter for transmitting a beam of radiant energy across the opening and a receiver for receiving radiant energy. The radiant signal is preferably modulated at the transmitter and demodulated at the receiver to insure the received signal is the transmitted signal. A level sensor inhibits generation of the safety signal if the magnitude of radiant energy received by said receiver exceeds a predetermined amount. This is to filter out extraneous signals of the same type as the transmitted radiant signal.

A safety signal generator produces an active safety signal upon unobstructed receipt of radiant energy by the receiver and does not generate this active safety signal upon failure to receive this radiant energy. The controller of the automatic door operator is connected to the radiant beam obstruction detector and operates to at least stop the motor to stop movement of the door upon failure to receive the active safety signal when the motor is closing the door. The radiant beam obstruction detector includes a lamp providing a visual indication of whether the receiver receives an unobstructed signal. The obstruction detector may further include an annunciator that sounds upon failure of unobstructed receipt of radiant energy by said receiver.

This radiant beam obstruction detector preferably requires electrical connection at only one side of the opening. This is achieved by disposing the transmitter and receiver in a housing on a first side of the opening. The transmitter directs the radiant beam to a reflector on the other side of the opening. This reflector reflects the radiant beam to the receiver for detection.

The present invention preferably includes a two wire cable connecting the supplemental obstruction detector to the controller of the automatic door operator. The controller supplies power for operation of the supplemental obstruction detector via these two wires. The supplemental obstruction detector signals the controller via the same two wire cable.

A safety signal generator transmits an active safety signal by repetitively shorting the two wires at a predetermined rate. This predetermined rate is preferably less than 100 Hz and may be in the range between 33 Hz and 50 Hz. This pulse rate minimizes production of radio frequency interference. The failure to detect this active safety signal is interpreted as an obstruction. An open or short of the two wires is detected as a system failure or obstruction. Note that the supplemental obstruction detector is employed only for closing the door. When opening the door the signal from the supplemental obstruction detector is ignored.

The controller includes a provision to override the obstruction signal to close the door. Constant activation of the portable transmitter or constant depression of the local push button overrides the obstruction detector. In an alternative embodiment, only constant depression of the local push button will override the obstruction detector permitting closure of the door.

A compressible obstruction detector is proposed as an alternative to the radiant beam obstruction detector. This compressible obstruction detector, also known as a safety edge, includes a compressible tube disposed on a leading end of the door. Such safety edges are available in both normally open, normally closed varieties as well as a hybrid variety with both normally open and normally closed contacts. These safety edges come in varieties having 2, 3 or four conductors. A safety signal generator connected to these conductors generates an active safety signal supplied to the controller when the state of the conductors indicates no obstruction has been encountered. The controller operates the same way as previously described, at least stopping the motor to stop movement of the door upon failure to receive the active safety signal.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

Figure 1:
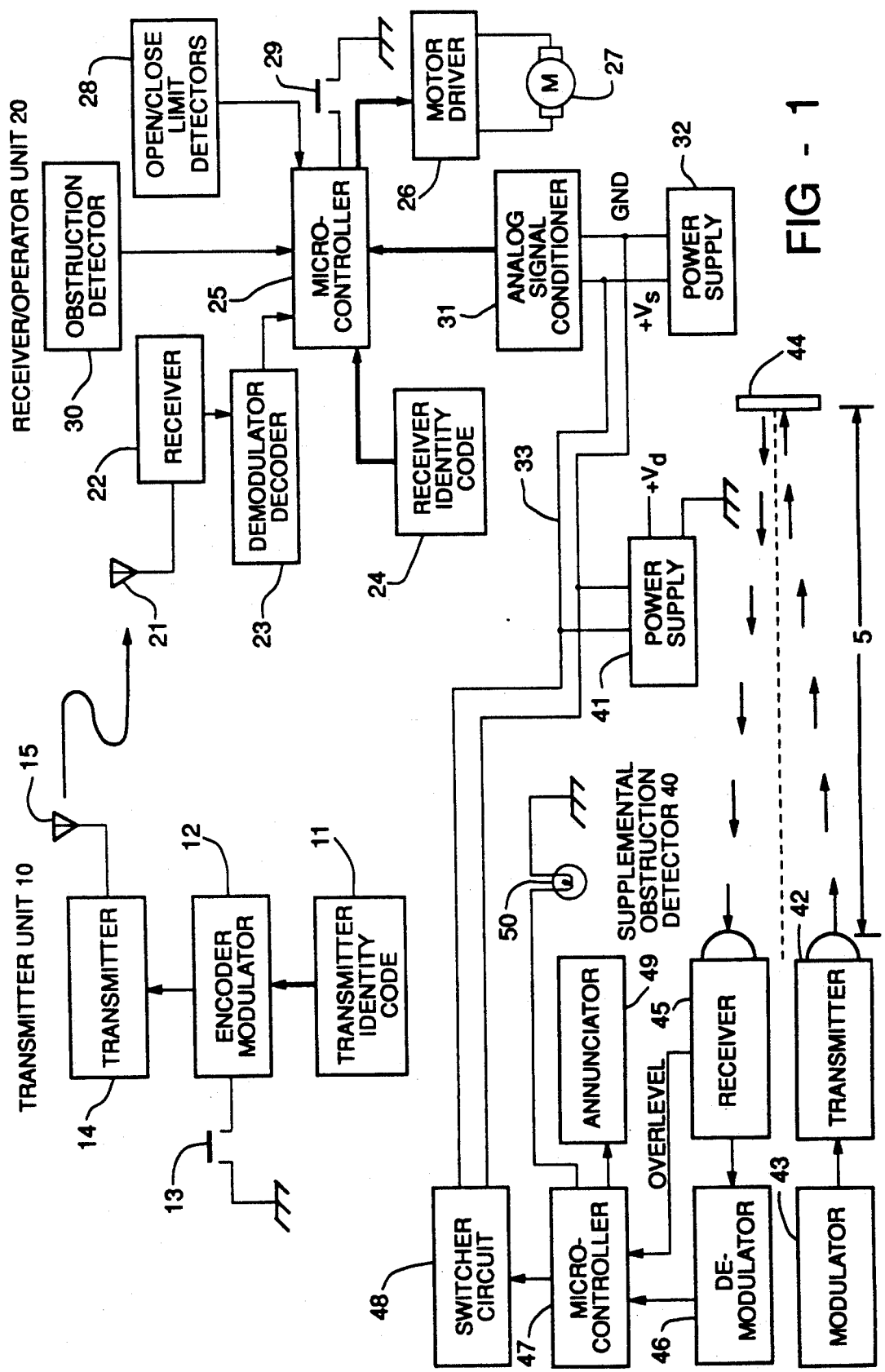
FIG. 1 is a schematic diagram illustrating the preferred embodiment of this invention.

FIG. 1 illustrates in block diagram form the major components this invention as used in a residential garage door operator. These components include a transmitter 10, a receiver/operator 20 and a supplemental obstruction detector 40. The typical system would include a single receiver/operator 20 with a corresponding supplemental obstruction detector 40 and one or more transmitters 10. FIG. 1 illustrates a single transmitter 10 for the sake of brevity.

Transmitter 10 includes a transmitter identity code setting device 11, an encoder/modulator 12, a momentary contact push button switch 13, a radio frequency transmitter 14 and an antenna 15. The user operates transmitter 10 by pressing push button switch 13. Encoder/modulator 12 reads the identity code set by transmitter identity code setting device 11 upon operation of push button switch 13. Encoder/modulator 12 then activates transmitter 14 to produce a radio frequency signal on a fixed frequency. Encoder/modulator 12 also modulates the transmission of transmitter 14 with the transmitter identity code. Transmitter 14 radiates this modulated radio frequency signal via antenna 15.

According to one technique known in the art, transmitter identity code setting device 11 is a set of manually operable switches. Each switch has two positions for selection of a digital "1" or "0" for the corresponding bit of the code. It is known in the art to provide the set of switches in a dual in line package. This package is of the same type used to house integrated circuits and is readily mounted on a printed circuit board. It is also known in the art to provide such a code setting device with 10 switches permitting the setting of one of $2^{10}$ or 1024 possible codes.

Receiver/operator 20 operates the garage door via a motor 27 according to radio frequency signals received from a transmitter 10 and other input signals. Radio frequency signals received by antenna 21 are coupled to receiver 22. Demodulator 23 demodulates any identity code modulated on the received radio frequency signal. Demodulator 22 also supplies this demodulated identity code to microcontroller 25. Microcontroller 25 determines if the demodulated identity code matches the receiver identity code set by receiver identity code setting device 24. Receiver identity code setting device 24 is preferably a set of switches disposed in a dual in line package of the same type as transmitter identity code setting device 11.

Microcontroller 25 operates motor controller 26 upon receipt of a demodulated identity code from demodulator 23 which matches the identity code set by receiver identity code setting device 24. Motor controller 26 in turn controls motor 27 for movement of the garage door. Motor 26 is mechanically coupled to the door in a manner known in the art. It is known in the art to operate the door in a circular four phase sequence to 1) open the door, 2) stop, 3) close the door, and 4) stop upon each receipt of a properly encoded radio frequency signal. Open and close limit detectors 28 signal microcontroller 25 to stop motor operation upon reaching the fully closed and the fully opened positions in a manner known in the art. It is also known in the art to provide momentary contact push button switch 29 directly coupled to microcontroller 25. Microcontroller 25 controls the garage door in response to activation of push button 29 in a manner similar to operation upon receipt of a properly coded radio frequency signal. Microcontroller 25 is preferably embodied in a microprocessor circuit having read/write random access memory and a control program fixed in read only memory.

The provision of a multibit signal encoded in the radio frequency transmissions serves a security function. This insures that receiver/operator 20 is not responsive to every radio frequency transmission but only to those properly encoded. Transmission of the properly encoded signal is analogous to selection of the proper key for operating a lock. Provision of identity code setting devices 11 and 24 as manually operable switches permits the user to control the code used. Generally identity code setting devices 11 and 24 may be accessed only by opening a door or removing a panel. The user may at any time select an arbitrary one of the 1024 feasible codes at receiver/operator 20 by changing the switches in receiver identity code setting device 24. A similar change made in transmitter identity code setting device 11 in each of the transmitter units 10 permits these units to control to door. Note that this description is by way of example only and that there are other methods for selecting and entering the identity codes known in the art.

Receiver/operator 20 includes an obstruction detector 30. It should be clear that a mechanically operated door poses a hazard to person and property under certain conditions. Children are particularly at risk because they might carelessly play with the automatic garage door operator. Thus automatic garage door operators generally include some form of obstruction detection. FIG. 1 illustrates this in the form of obstruction detector 30. An obstruction detection technique known in the art uses the tension of the drive train. Generally motor 27 is coupled to the door via a chain or screw drive. A switch is mechanically coupled to the drive train. This switch is normally closed but is opened when the drive train tension exceeds a predetermined amount. Microcontroller 25 detects the state of this switch and aborts the door operation when it trips. Typically microcontroller 25 stops the door upon detection of an obstruction while opening and stops the door and reverses to the fully open position upon detection of a obstruction while closing.

It is increasingly being realized that this type of obstruction detection is insufficiently sensitive to prevent all possible injuries. There are state regulatory authorities proposing regulations requiring additional obstruction detectors. One on the types of additional obstruction detectors under consideration is radiant obstruction detectors. A radiant beam, generally infrared or visible light, is projected across the lower portion of the opening of the controlled door. Interruption of the radiant beam is interpreted as detection of an obstruction and the automatic door operator takes appropriate remedial action. A second type of additional obstruction detector is a pressure sensitive strip disposed on the leading edge of the controlled door. These pressure sensitive strips are known as safety edges. Detection of pressure on this pressure sensitive strip indicates an obstruction. Note that these additional obstruction detectors generally operate only while closing the door. Since door closing is known to the most dangerous operation of automatic garage doors, this limitation does not severely restrict the utility of these additional obstruction detectors.

FIG. 1 also illustrates supplemental obstruction detector 40. Certain parts of receiver/operator 20 cooperate with supplemental obstruction detector 40 to control door operation. Receiver/operator 20 is coupled to supplemental obstruction detector 40 via wires 33. Wires 33 preferably comprise a twisted pair of wires. Receiver/operator 20 supplies electric power to supplemental obstruction detector 40 via wires 33. Power supply 32 couples a supply voltage $+V_s$ across wires 33. Power supply 41, located in supplemental obstruction detector 40, extracts the electric power from wires 33 and produces an operating voltage $+V_d$ for use by the powered components of supplemental obstruction detector 40. The active safety signal from switcher circuit 48 is detected by analog signal conditioner 31.

Supplemental obstruction detector 40 includes a transmitter 42 for transmission of a radiant beam. Transmitter 42 preferably generates infrared light. Other forms of radiant energy, such as visible light and ultrasound are also feasible. Modulator 43 modulates the transmission of transmitter 42. The manner of this modulation and the reason for employing modulation will be explained below.

The radiant energy produced by transmitter 42 is directed across opening 5. Opening 5 is the opening corresponding to the garage door. A reflector 44 disposed at the far side of opening 5 reflects this radiant beam. At least some of the reflected radiant energy reaches receiver 45. This reflection technique, which is known in the art, is used for several reasons. Electric power and signal lines need only be routed to one side of opening 5 because reflector 44 is completely passive. This saves installation labor and expense. This technique also reduces the effort required to align transmitter 42 and receiver 45. Transmitter 42 and receiver 45 may be manufactured in a prealigned package. Reflector 44 retroreflects the radiant beam from a range of angles. This can be accomplished using 15 corner reflectors. Thus proper alignment only requires alignment of the combined transmitter/receiver toward reflector 44, while reflector 44 may be in a range of orientations.

Receiver 45 detects the radiant beam reflected by reflector 44. This radiant beam has a modulation imparted by modulator 43. Demodulator 46 detects the modulation imparted on the radiant beam by modulator 43. If the radiant beam received by receiver 45 includes this modulation, then demodulator 46 signals microcontroller 47 that the radiant beam is not interrupted. This modulation on the radiant beam serves to distinguish the proper signal from any other signals that may be received by receiver 45. When using infrared light, for example, receiver 45 may give a false positive signal in the presence of direct or reflected sunlight.

Microcontroller 47 employs the signal from demodulator 46 to control signaling receiver/operator 20 via switcher 48, actuation of annunciator 49 and illumination of lamp 50. The detection of a properly modulated signal by demodulator 46 indicates that the opening 5 is unobstructed. Microcontroller 47 preferably controls switcher 48 to produce an active safety signal when opening 5 is unobstructed. This provides a fail safe mechanism if some fault in wires 33 between receiver/operator 20 and supplemental obstruction detector 40.

This active safety signal produced by switcher circuit 48 is detected by analog signal conditioner 31. Analog signal conditioner 31 preferably employs a level sensor which detects when the signal exceeds a threshold. This threshold is set between ground and the voltage $V_s$ produced by power supply 32. It is envisioned that the voltage $V_s$ produced by power supply 32 is 5 volts and that the threshold of analog signal conditioner 31 is set at 4 volts. Analog signal conditioner 31 produces a switching signal only when the active safety signal regularly crosses the threshold of the level sensor. Microcontroller 25 is programmed to expect this switching signal and to indicate an obstruction or some system fault upon failure to detect this switching signal.

Receiver 45 additionally detects the received radiant signal level. If this received radiant signal level exceeds a predetermined level, then receiver 45 generates an overlevel signal. The predetermined level is set above the maximum expected received radiant signal level for the smallest opening 5. Microcontroller 47 controls switcher circuit 48 to stop generation of the active safety signal upon receipt of the overlevel signal from receiver 45. This received overlevel signal is an indication of some fault in supplemental obstruction detector 40 and receiver/operator 40 takes the same remedial action as if an obstruction has been detected.

Figure 2:
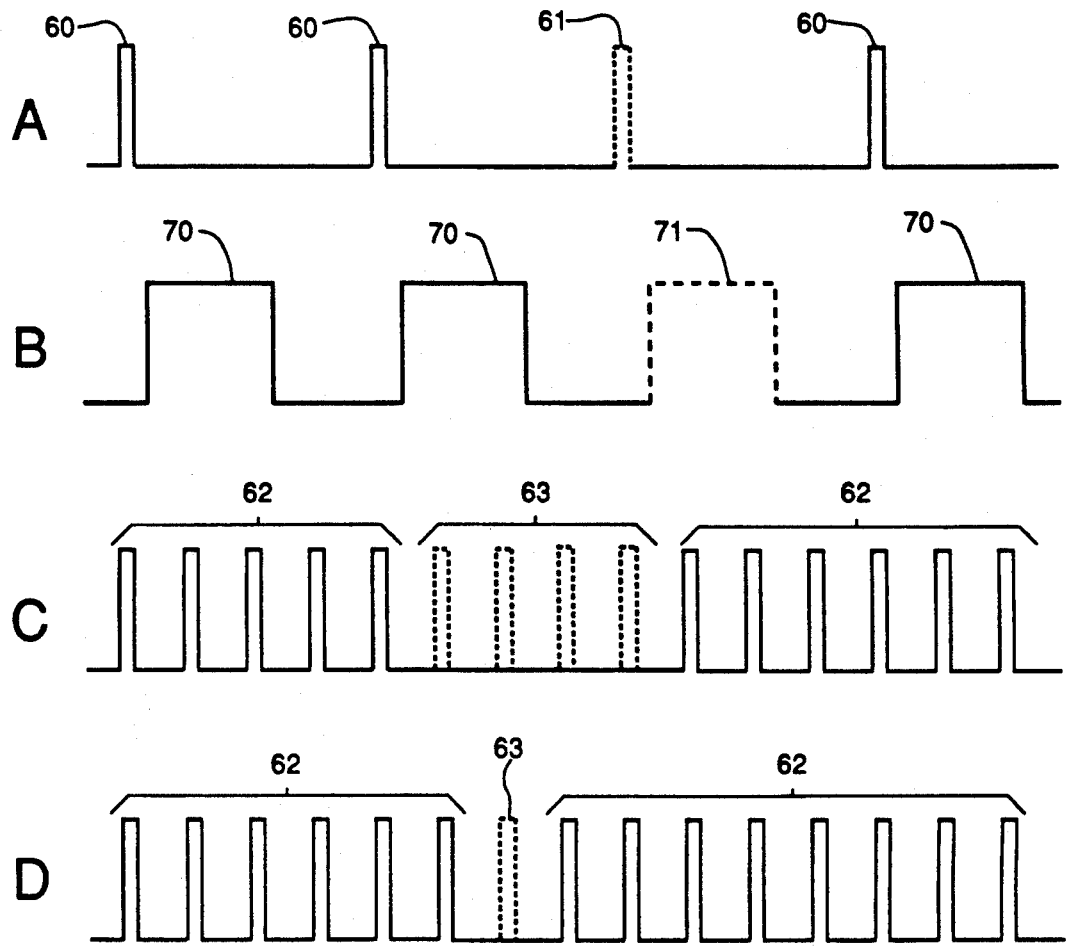
FIG. 2 is a timing diagram illustrating examples of various signals in the present invention.

FIGS. 2a to 2d illustrate various signals useful in understanding the operation of the supplemental obstruction detection system of this invention. FIG. 2a shows an example of a received and demodulated signal from demodulator 46. Modulator 43 modulates transmitter 42 to produce radiant energy in pulses. These pulses are received and detected by receiver 45 and demodulator 46 in the form of pulses 60. Each transmitted pulse may also include additional modulation imparted by modulator 43 that has been demodulated by demodulator 46. Transmission of pulses at a relatively low duty cycle is preferred to reduce the consumption of electric power within supplemental obstruction detector 40.

FIG. 2a illustrates pulses 60 occurring at regular repetitive intervals. As noted above these pulses 60 correspond to pulses of radiant energy produced by transmitter 42. At 61 a pulse is missing, indicating interruption of the radiant beam. Microcontroller 47 controls switcher circuit 48 to signal receiver/operator 20 via wires 33. Normally switcher circuit 48 produces a square wave signal such as illustrated in FIG. 2b. Each pulse 70 corresponds to a received pulse 60. Note missing pulse 71 corresponding to missing pulse 61.

Supplemental obstruction detection system need not operate on the one to one ratio of pulses as illustrated in FIGS. 2a and 2b. Because of the length of wires 33, the pulse rate transmitted via these wires should be relatively low to minimize radio frequency interference generation. A pulse repetition rate of less than 100 Hz and preferably between 33 and 50 Hz would provide sufficiently low radio frequency interference generation for most installations. On the other hand, transmitter 42 may operate at a higher rate. The repetition rate of transmitter 42 is related to the shortest duration obstruction that needs to be detected. Accordingly, microcontroller 47 may be programmed to receive pulses at a first rate and control switcher circuit 48 to operate at a lower pulse repetition rate. FIG. 2c illustrates pulses 62, which occur at a rate four times faster than pulses 70. During interval 63 the pulses are missing. This indicates that the radiant beam has been interrupted. Accordingly, microcontroller 47 controls switcher circuit 48 to produce the same output as illustrated in FIG. 2b as in the prior example.

Microcontroller 47 can be made more sensitive when transmitter 42 operates at a higher rate than switcher circuit 48. FIG. 2d shows pulses 62 with a single missing pulse at 63. Microcontroller 47 is responsive to the single missing pulse, indicating momentary interruption of the radiant beam, to omit one pulse 71 as illustrated in FIG. 2b. Alternatively, microcontroller 47 may require more than one missing transmission before omitting one pulse 71. By this means, receiver/operator 20 may be responsive to momentary interruption of the radiant beam that is shorter in time than the pulse period of pulses 70.

Supplemental obstruction detector 40 may include annunciator 49 that is used to signal the user. Annunciator 49 audibly signals when microcontroller 47 detects interruption of the radiant beam. Preferably microcontroller 25 activates annunciator 49 only when the interruption of the radiant beam is longer a predetermined period of time. This predetermined period of time should be about five seconds. Thereafter annunciator 49 may continuously sound or may be pulsed. This audible alarm serves to alert the user only if the door is obstructed for longer than the predetermined period of time. Thus the user is not annoyed by momentary interruptions of the radiant beam, such as persons passing in and out of the open garage door.

Lamp 50 aids in initial alignment of supplemental obstruction detector 40. Lamp 50 preferably operates in one of two alternate modes. In the first mode, lamp 50 blinks upon application of electric power to supplemental obstruction detector 40 when the radiant beam is interrupted and is continuously on when the radiant beam is not interrupted. Thus the operator can view lamp 50 from either the location of transmitter 42 and receiver 45 or from the location of reflector 44 to determine if the radiant beam has been properly aligned during installation of supplemental obstruction detector 40. This can be particularly useful when installing reflector 44. In the alternative mode, the roles of blinking and constant illumination of lamp 50 are reversed. Thus lamp 50 is continuously on upon application of electric power to supplemental obstruction detector 40 when the radiant beam is interrupted and blinks when the radiant beam is not interrupted. As a further alternative, lamp 50 remains off when receiver 45 does not receive the radiant signal and blinks when receiver 45 receives the radiant signal. In any case the installer can determine when the supplemental obstruction detector 40 is properly installed by observing lamp 50. In this regard it is preferable that microcontroller 47 not activate annunciator 49 except upon interruption of the radiant beam, that is, only after proper reception of the radiant beam followed by failure of reception. This prevents annoying activation of annunciator 49 until after alignment of the radiant beam.

Receiver/operator 20 preferably includes some manner of closing the door even after failure of supplemental obstruction detector 40. This would permit use of the controlled door during the interval between failure of supplemental obstruction detector 40 and its repair. In the preferred embodiment the door can be closed by constant operation of transmitter 10 via push button 13 or by constant operation of push button 29, even if supplemental obstruction detector 40 fails to generate the active safety signal. This requirement of constant operation, requiring constant operator attention, alerts the operator to take special care in observing the door operation to look out for obstructions. In an alternative embodiment of this feature, the door may be closed only upon constant operation of push button switch 29 and not by constant operation of push button 13. This serves to further emphasize to the user the need for caution.

The supplemental obstruction detector shown in FIG. 1 and described above is not without problems. With some types of doors an obstruction may be located in a position not protected by the radiant signal. This is particularly true of one piece doors which tend to swing well outside of the door threshold when closing. A supplemental obstruction detector that attaches to the leading edge of the door is better suited to these doors. Obstruction detectors of this type are known in the art. These safety edges may be constructed to operate in a normally open mode or in a normally closed mode. A safety edge constructed to be normally open typically includes a pair of conductors disposed in a resilient tube. Normally this pair of conductors are electrically isolated. When the safety edge meets an obstruction, the resilient tube collapses causing the pair of conductors to electrically contact. Normally closed safety edges operate in a similar fashion except that the pair of conductors are normally connected electrically and are electrically isolated upon contact with an obstruction. In either case the change in conductive condition indicates contact with an obstruction. It is also known in the art to provide a hybrid safety edge with a combination of normally open and normally closed conductors with either three conductors, where a common conductor is user in both the normally open and the normally closed circuits, or four conductors, where the normally open and normally closed circuits are separate. These safety edges have heretofore not been employed with an active safety signal.

Figure 3:
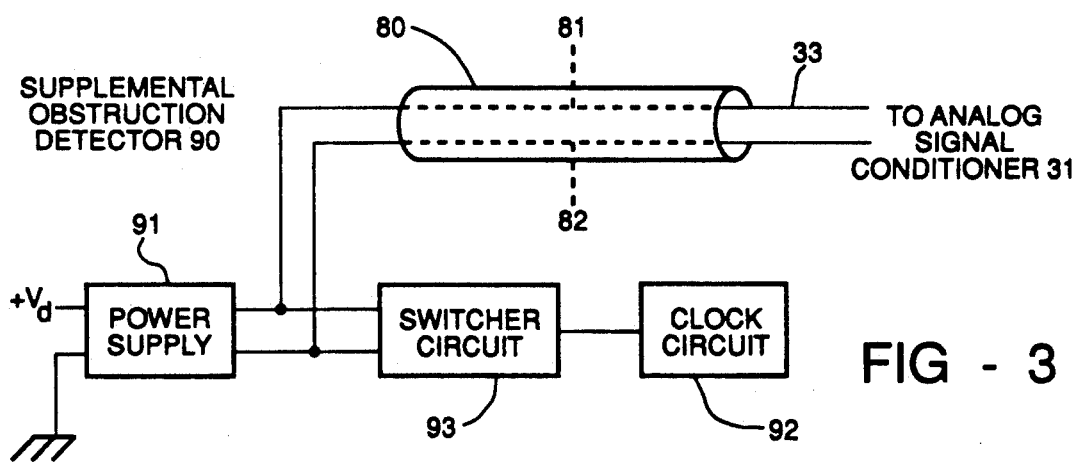
FIG. 3 is a schematic diagram illustrating an alternative embodiment of this invention employing a safety edge.

FIG. 3 illustrates an alternative embodiment of the supplemental obstruction detector employing a normally open safety edge. Supplemental obstruction detector 90 is employed with the known safety edge 80. Safety edge 80 is disposed on the leading edge of the door. Safety edge 80 includes a resilient tube having conductors 81 and 82. When safety edge 80 meets an obstruction, this tube collapses causing conductors 81 and 82 to electrically contact.

Supplemental obstruction detector 90 is electrically connected to the far end of safety edge 80. Power supply 91 receives power from conductors 81 and 82 to power clock circuit 92 and switcher 93. Clock circuit 92 controls switcher 93 to produce the cycling signal illustrated in FIG. 2b. Receiver/operator 20 receives this signal via analog signal conditioner 31 and employs it in the same manner as previously described. A cycling signal indicates a properly operating obstruction detector that has not detected an obstruction. A non-cycling signal indicates detection of an obstruction or the existence of a fault. When safety edge 80 encounters and obstacle, this shorts the supply of electric power to supplemental obstruction detector 90 and also shorts the transmission of the active control signal, thus indicating an obstruction to the receiver/operator 20.

Figure 4:
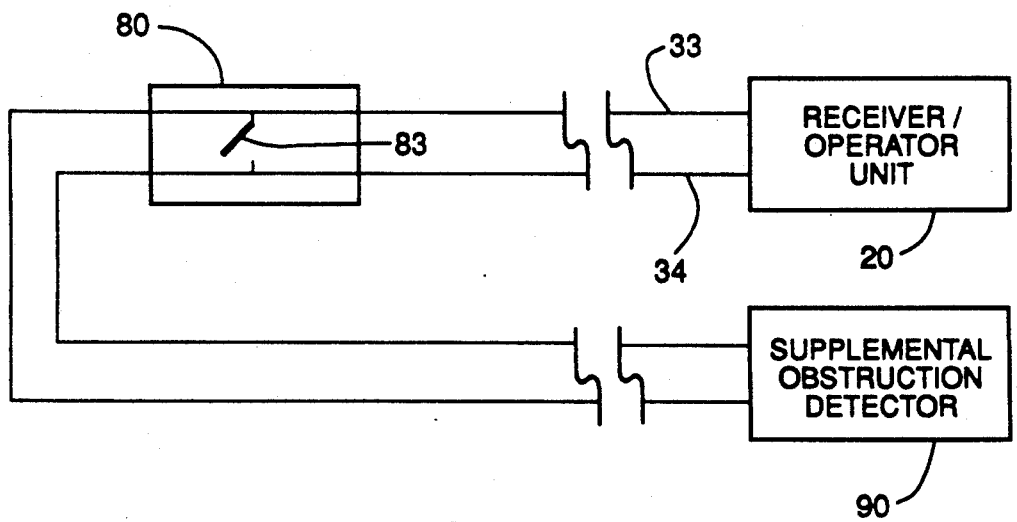
FIG. 4 is a schematic diagram illustrating a further alternative embodiment of this invention employing a safety edge.

FIG. 4 illustrates an alternative manner of placement of the parts illustrated in FIG. 3. In FIG. 4, receiver/operator 20 and supplemental obstruction detector 90 are physically adjacent. Safety strip 80, here illustrated schematically as including normally open switch 83, is connected at one end to wires 33. The other end of safety strip 80 is connected to supplemental obstruction detector 90 via wires 34. Thus supplemental obstruction detector 90 is electrically connected the same as illustrated in FIG. 3, while physically located adjacent to receiver/operator 20. The circuit illustrated in FIG. 4 may permit direct powering of supplemental obstruction detector 90 rather than powering this circuit via lines 33 as illustrated in FIG. 3. This would permit elimination of power supply 32 and power supply 91. Note that a normally closed safety edge may be substituted for normally open safety edge 80 in the circuits of FIGS. 3 and 4.

Supplemental obstruction systems such as illustrated in FIGS. 3 and 4 encounter a difficulty not encountered in supplemental obstruction detector 40. Upon reaching the fully closed position of the door, the safety edge meets the floor and causes an obstruction detection. This unwanted obstruction detection could cause the door to reverse and fully open defeating the intended door operation. Some manner of defeating reaction to this obstruction detection of the floor is necessary.

Figure 5:
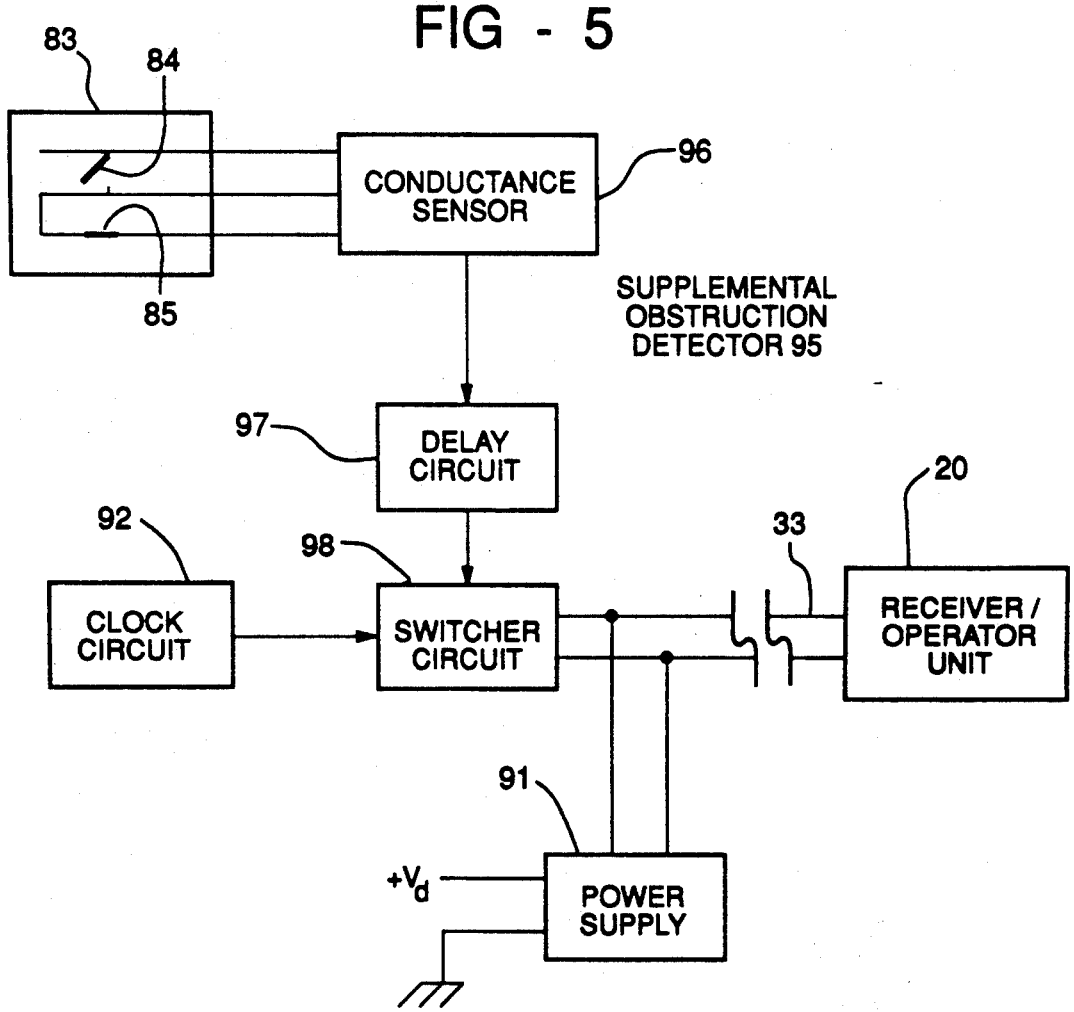
FIG. 5 is a schematic diagram illustrating a still further alternative embodiment of this invention employing a safety edge.

FIG. 5 illustrates a circuit which prevents obstruction detection of the floor by the safety edge. Supplemental obstruction detector 95 includes power supply 91, clock circuit 92, conductance sensor 96, delay circuit 97 and switching circuit 98. Conductance sensor 96 detects the conductive condition of safety edge 84. FIG. 5 illustrates safety edge 84 schematically as including normally open switch 85 and normally closed switch 86 coupled to three wires. Conductance sensor 96 determines when the conductive condition of normally open switch 85 and/or normally closed switch 86 changes. Upon detection of any such change, which indicates encountering an obstruction, conductance sensor 96 generates a signal to delay circuit 97. Note although FIG. 5 illustrates a three wire hybrid safety edge with normally open and normally closed contacts, those skilled in the are would realize that conductance sensor 96 could easily be constructed to detect the change of conductive state of a two wire normally open safety edge, a two wire normally closed safety edge or a four wire hybrid safety edge with both normally open and normally closed contacts.

Delay circuit 97 permits the door to close even upon activation of the safety edge 84 at the floor. In the absence of an obstruction detection, switcher circuit 98 operates in the same fashion as switcher circuit 93 illustrated in FIG. 3. Switcher circuit 98 generates the active safety signal at a rate determined by clock circuit 92. Switcher circuit 98 stops generating this active control signal upon receipt of a signal from delay circuit 97. The delay of delay circuit 97 is selected so that the door is completely closed and stopped before indication of the obstruction detection at the floor reaches receiver/operator 20. Since the door is stopped, the late arriving obstruction signal is ignored. This delay will generally be about a half second. A delay of this length is not believed to present a problem to detection of actual obstructions. By placing the delay in supplemental obstruction detector 95, receiver/operator 20 may be constructed identically for attachment to either supplemental obstruction detector 40 illustrated in FIG. 1, supplemental obstruction detector 90 illustrated in FIG. 3, or supplemental obstruction detector 95 illustrated in FIG. 5.

This supplemental obstruction detector of this invention has several advantages. It detects obstruction of the path of the closing door. Normal operation is affirmatively indicated so that system faults will not falsely indicate an unobstructed door. The receiver/operator can be installed alone or with the supplemental obstruction detector because it detects the present or absence of the supplemental obstruction detector and acts appropriately. The receiver/operator can accept more than one form of the supplemental obstruction detector.

I claim:

1. In an automatic door operator having a motor coupled for moving a door between an open position and a closed position covering an opening, and a controller controlling operation of the motor corresponding to command signals, the improvement comprising:
   a supplemental obstruction detector disposed proximate the opening including
      obstruction detection means for detecting when the opening is unobstructed,
      a safety signal generator connected to said obstruction detection means for generating an active safety signal upon detection that the opening is unobstructed, and not generating said active safety signal upon failure to detect that the opening is unobstructed, said active safety signal cycling to repetitively cross a predetermined threshold voltage; and
   the controller being connected to said supplemental obstruction detector for at least stopping the motor to stop movement of the door upon failure to receive said active safety signal from said supplemental obstruction detector when the motor is closing the door;
   wherein the automatic door operator includes a manually operable push button for entry of said command signals, the controller normally initiating door operation upon momentary operation of the push button during receipt of said active safety signal,
   the controller being further operative to close the door upon constant operation of the push button during failure to receive said active safety signal from said supplemental obstruction detector.

2. The improvement claimed in claim 1, wherein the automatic door operator includes a second manually operable push button connected to the controller via a wireless transmitter, the controller normally initiating door operation upon momentary operation of the second push button during receipt of said active safety signal, said improvement wherein:
   the controller being further operative to not close the door upon constant operation of the second push button during failure to receive said active safety signal from said supplemental obstruction detector.

3. In an automatic door operator having a motor coupled for moving a door between an open position and a closed position covering an opening, and a controller controlling operation of the motor corresponding to command signals, the improvement comprising:
   a supplemental obstruction detector disposed proximate the opening;
   a two wire cable connecting said supplemental obstruction detector to the controller;
   the supplemental obstruction detector including
      a power receiving means connected to the two wire cable for receiving electric power for operation of the supplemental obstruction detector via the two wire cable,
      obstruction detection means for detecting when the opening is unobstructed,
      a safety signal generator connected to said obstruction detection means for generating an active safety signal upon detection that the opening is unobstructed, and not generating said active safety signal upon failure to detect that the opening is unobstructed, said active safety signal cycling to repetitively cross a predetermined threshold voltage, and
      a safety signal transmitter connected to the safety signal generator and the two wire cable for transmitting the active safety signal via the two wire cable; and the controller further includes a power supply means connected to the two wire cable for supplying electric power via the two wire cable, and a safety signal sensing means connected to the two wire cable for detecting the presence or absence of the active safety signal on the two wire cable by detecting whether the voltage across the two wire cable regularly crosses the threshold voltage; and the controller being connected to said supplemental obstruction detector for at least stopping the motor to stop movement of the door upon failure to receive said active safety signal from said supplemental obstruction detector when the motor is closing the door.

4. The improvement claimed in claim 3, wherein: said safety signal generator generates said active safety signal by repetitively shorting said two wire cable at a predetermined repetition rate upon detection that the opening is unobstructed.

5. The improvement claimed in claim 4, wherein: said predetermined repetition rate of said safety signal generator is less than 100 Hz.

6. The improvement claimed in claim 5, wherein: aid predetermined repetition rate of said safety signal generator is in the range between 33 Hz and 50 Hz.

7. The improvement claimed in claim 3, wherein: said supplemental obstruction detector includes a transmitter for transmitting a beam of radiant energy across the opening, a receiver for receiving said beam of radiant energy, and wherein said safety signal generator is connected to said receiver for generating said active safety signal upon unobstructed receipt of beam of radiant energy by said receiver and not generating said active safety signal upon failure of unobstructed receipt of said beam of radiant energy by said receiver.

8. The improvement claimed in claim 7, wherein: said supplemental obstruction detector further includes a housing disposed at a first side of the opening having said transmitter and said receiver disposed therein, and a reflector disposed at a second side of the opening opposite said first side for reflecting said beam of radiant energy received from said transmitter to said receiver.

9. The improvement claimed in claim 7, wherein: said safety signal generator generates said active safety signal as a series of pulses at a predetermined repetition rate upon detection that the opening is unobstructed, said transmitter transmits said beam of radiant energy as short radiant pulses at a pulse repetition rate which is a multiple of said predetermined repetition rate, and said transmitter omits production of at least one of said series of pulses upon failure of receipt of more than a predetermined number of consecutive radiant pulses by said receiver, said predetermined number of consecutive radiant pulses being less than said multiple.

10. The improvement claimed in claim 9, wherein: said predetermined number of consecutive radiant pulses is one.

11. The improvement claimed in claim 7, wherein: said supplemental obstruction detector further includes a lamp; and a signaling means connected to said receiver and said lamp for continuously illuminating said lamp upon application of electrical power and failure of unobstructed receipt of said beam of radiant energy by said receiver and for blinking said lamp upon unobstructed receipt of said beam of radiant energy by said receiver.

12. The improvement claimed in claim 7, wherein: said supplemental obstruction detector further includes a lamp; and a signaling means connected to said receiver and said lamp for blinking said lamp upon application of electrical power and failure of unobstructed receipt of said beam of radiant energy by said receiver and for continuously illuminating said lamp upon unobstructed receipt of said beam of radiant energy by said receiver.

13. The improvement claimed in claim 7, wherein: said supplemental obstruction detector further includes a lamp; and a signaling means connected to said receiver and said lamp for blinking said lamp upon unobstructed receipt of said beam of radiant energy by said receiver.

14. The improvement claimed in claim 7, wherein: said supplemental obstruction detector further includes an annunciator connected to said safety signal generator for generating an aurally perceivable indication upon failure in unobstructed receipt of said beam of radiant energy by said receiver.

15. The improvement claimed in claim 7, wherein: said supplemental obstruction detector further includes an annunciator connected to said safety signal generator for generating an aurally perceivable indication upon failure in unobstructed receipt of said beam of radiant energy by said receiver for longer than a predetermined period of time.

16. The improvement claimed in claim 15, wherein: said predetermined period of time of said annunciator is five seconds.

17. The improvement claimed in claim 7, wherein: said supplemental obstruction detector further includes a modulator connected to said transmitter for causing said transmitter to transmit said beam of radiant energy having a predetermined modulation; and a demodulator connected to said receiver and said safety signal generator for enabling said safety signal generator to generate said active safety signal only if said receiver receives said beam of radiant energy having said predetermined modulation.

18. The improvement claimed in claim 7, wherein: said supplemental obstruction detector further includes a level sensing means connected to said receiver and said safety signal generator for inhibiting said safety signal generator from generating said active safety signal if the magnitude of said beam of radiant energy received by said receiver exceeds a predetermined amount.

19. The improvement claimed in claim 3, wherein:
said supplemental obstruction detector includes
a compressible tube disposed on a leading end of the door having first and second ends and plural conductors, said plural conductors having a first conductive relationship therebetween when said compressible tube is not compressed and a second conductive relationship therebetween when said compressible tube is compressed, said second conductive relationship being different from said first conductive relationship, and
a safety signal transmitter connected to said plural conductors for transmitting said active safety signal when said plural conductors have said first conductive relationship.

20. The improvement claimed in claim 19 wherein:
said plural conductors consist of two conductors,
said first conductive relationship consists of conduction between said two conductors, and
said second conductive relationship consists of nonconduction between said two conductors.

21. The improvement claimed in claim 19, wherein:
said plural conductors consist of two conductors,
said first conductive relationship consists of nonconduction between said two conductors, and
said second conductive relationship consists of conduction between said two conductors.

22. The improvement claimed in claim 19 wherein:
said plural conductors includes more than two conductors,
said first conductive relationship consists of conduction between a first pair of said plural conductors and nonconduction between a second pair of said plural conductors, and
said second conductive relationship consists of nonconduction between said first pair of said plural conductors and conduction between said second pair of said plural conductors.

23. The improvement claimed in claim 19, wherein:
said supplemental obstruction detector further includes
a conductance detector connected to said plural conductors of said compressible tube and said safety signal transmitter for detecting the conductive relationship among said plural conductors, for enabling said safety signal transmitter to transmit said active safety signal when said plural conductors have said first conductive relationship and disabling said safety transmitter from transmitting said active safety signal when said plural conductors have said second conductive relationship.

24. The improvement claimed in claim 19, wherein:
said supplemental obstruction detector further includes
a conductance detector connected to said plural conductors of said compressible tube for detecting the conductive relationship among said plural conductors,
a delay circuit connected to said conductance detector and said safety signal transmitter for normally enabling said safety signal transmitter to transmit said active safety signal and for disabling said safety transmitter from transmitting said active safety signal a predetermined period of time after said plural conductors have said second conductive relationship.

25. The improvement as claimed in claim 24, wherein:
said predetermined period of time of said delay circuit is one half second.

* * * * *